United States Patent Office 3,666,371
Patented May 30, 1972

3,666,371
APPARATUS FOR MEASURING THE RELATIVE DISPLACEMENT OF AN OBJECT
Hendrik de Lang, Emmasingel, Netherlands, assignor to U.S. Philips Corporation, New York, N.Y.
Filed Feb. 4, 1971, Ser. No. 112,722
Claims priority, application Netherlands, Feb. 7, 1970, 7001770
Int. Cl. G01b 11/00
U.S. Cl. 356—167                4 Claims

ABSTRACT OF THE DISCLOSURE

An apparatus is discussed for measuring the relative displacement of an object, in particular a measuring slide, with respect to a fixed reference point by means of at least one optical element which is rigidly secured mechanically to the object and reflects radiation from a source of radiation which emits two beams of radiation polarized at right angles to one another which beams are divided in two spatially separated sub-beams by a polarisation-sensitive beam splitting mirror the optical element having been inserted in the path of one sub-beam so as to extend at right angles to the direction of this sub-beam, a reflector having been inserted on the path of the other sub-beam, which sub-beams are combined and then are applied to a radiation detector from which an electrical signal is derived which is a measure of the displacement. It is set forth that for this purpose there is inserted in the path of the sub-beam which is reflected at the optical element, which element is a high-precision plane mirror, an $n\lambda/4$ plate (where $n$ is an odd integer) which is arranged in diagonal orientation and is traversed four times by the respective sub-beam, for which purpose this sub-beam after twice having traversed the $n\lambda/4$ plate is reflected, by way of the polarisation-sensitive beam-splitting mirror, at a retrodirective element.

Figure 1:
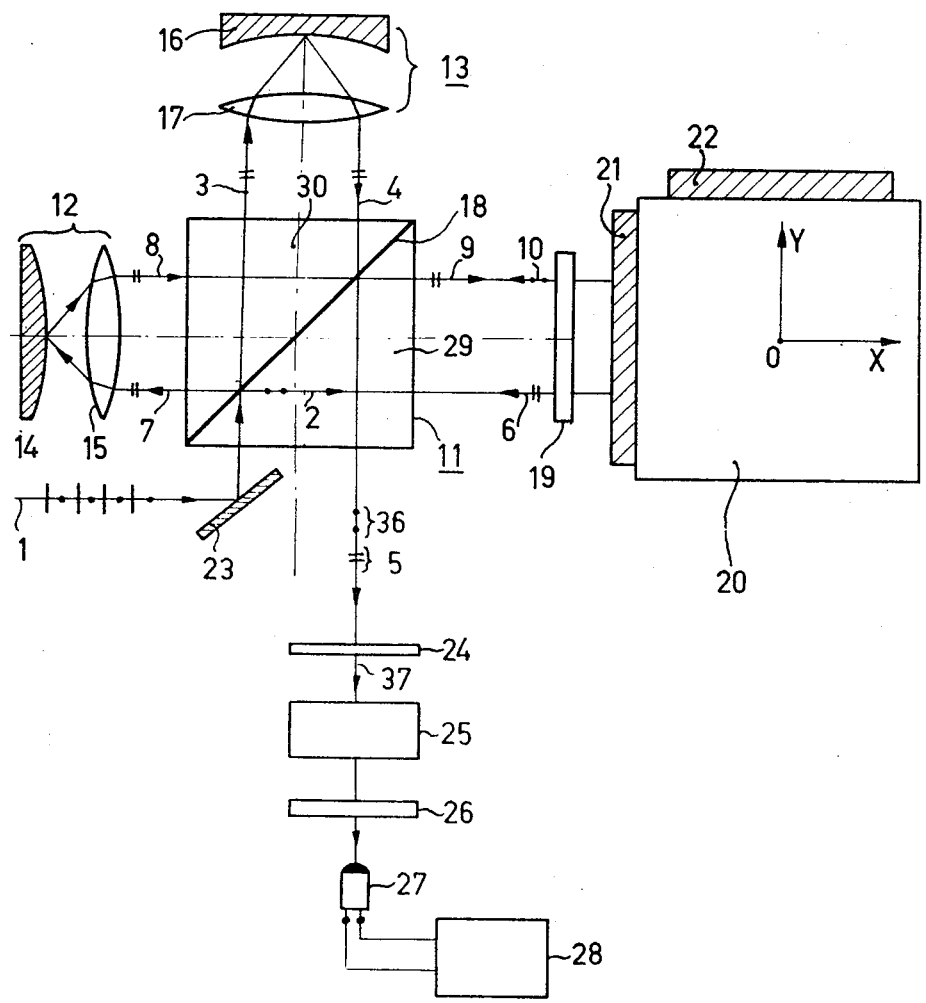

The invention relates to an apparatus for measuring the relative displacement of an object, in particular a measuring slide, with respect to a fixed reference point by means of at least one optical element which is rigidly secured mechanically to the object and reflects radiation from a source of radiation which emits two beams of radiation polarized at right angles to one another, which beams are divided in two spatially separated sub-beams by a polarisation-sensitive beam-splitting mirror, the optical element having been inserted in the path of one sub-beam so as to extend at right angles to the direction of this sub-beam, a reflector having been inserted in the path of the other sub-beam, which sub-beams are combined and then are applied to a radiation detector from which an electrical signal is derived which is a measure of the displacement.

An apparatus of the said type is known. Frequently the displacement of the object is required to be effected in a desired direction only with an extremely high degree of accuracy. Owing to this wish the straight line guidance of the system to which the object is mechanically attached has to satisfy particularly high requirements. When the object is a measuring slide, play will inevitably be produced in the members guiding the frame which carries the measuring slide.

The requirement of extremely accurate straight-line guidance may be fulfilled and the departure from the straight-line guidance may be removed. For this purpose, in the apparatus described in British patent specification No. 1,095,703 the object, in the case described a photographic plate, is secured to a reference plate arranged to be moved in two coordinate directions in the plane of the plates. Marks are provided on the reference plate. Each mark consists of two gratings disposed at right angles to one another and having parallel grating lines. The magnitude and the direction of the displacement of the object are measured and controlled by control voltages derived from optical signals reflected at the gratings.

Alternatively, as his been proposed in copending Dutch patent application 6801683 of prior date, the object may be rigidly attached by means of a frame to two gratings having parallel lines and disposed at right angles to one another in, or at least substantially in, the plane of the object. From the interaction of radiation beams with the gratings signals are derived which are a measure of the magnitude and direction of the displacement of the object. This provides a system of comparatively simple structure. Moreover, the measuring system lies outside the surface of the object, which consequently is readily accessible.

It is an object of the present invention to provide another solution of the problem, which solution combines high precision with small measuring steps. For this purpose, an apparatus according to the invention is characterized in that there is inserted in the path of the sub-beam which is reflected at the optical element, which element is a high-precision plane mirror, an $n\lambda/4$ plate (where $n$ is an odd integer) which is arranged in diagonal orientation and is traversed four times by the respective sub-beam, for which purpose this sub-beam after twice having traversed the $n\lambda/4$ plate is reflected, by way of the polarisation-sensitive beam-splitting mirror, at a retrodirective element.

Figure 2:
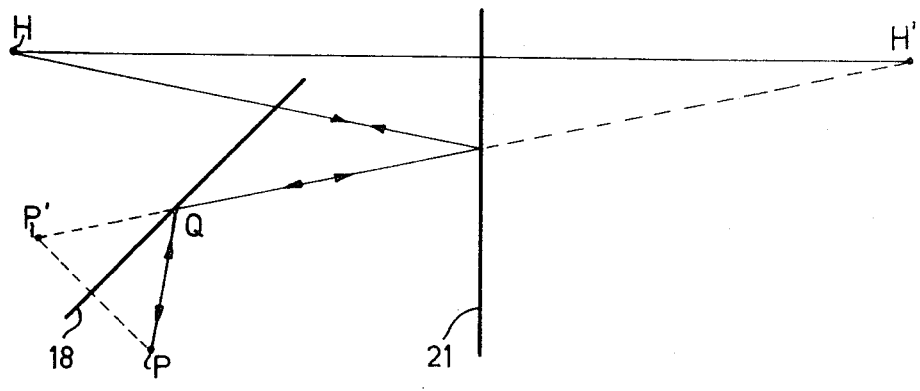
Figure 3:
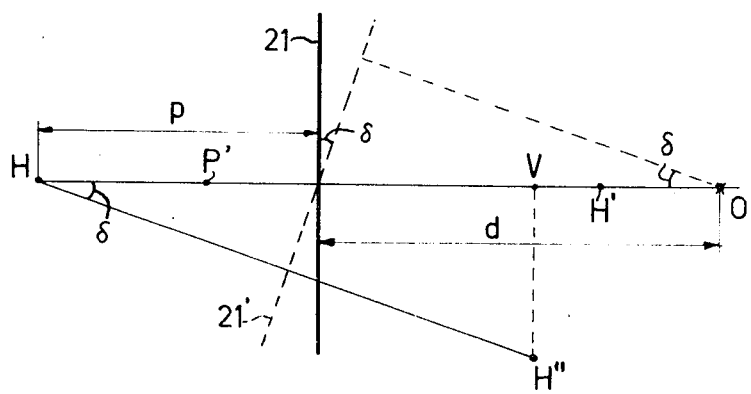

An embodiment of the invention will now be described, by way of example, with reference to the accompanying diagrammatic drawings, in which:

FIG. 1 shows schematically an embodiment of an apparatus according to the invention, and FIGS. 2 and 3 are geometrical diagrams illustrating the behaviour of the apparatus shown in FIG. 1.

Referring now to FIG. 1, there is shown an apparatus in which a collimated beam of light emanates from a source of light (not shown). The beam comprises two sub-beams polarized at right angles to one another. The direction of polarisation of one sub-beam is parallel to the plane of the drawing, and that of the other sub-beam is at right angles to the plane of the drawing. For the sake of simplicity the drawing shows only one ray of the beam, which ray is designated by the reference numeral 1. The beam is reflected at a plane mirror 23 and falls on a polarisation-selective beam-splitting prism 11 comprising two parts 29 and 30 the interface of which is provided with reflecting layers of alternate high and low indices of refraction. The two sub-beams are incident on the interface 18 between successive layers at the Brewster angle so that in the wavelength range used the sub-beam, the plane of polaristion of which is parallel to the plane of the drawing, is transmitted. A suitable choice of the thicknesses of the layers ensures that the sub-beam, the plane of polarisation of which is at right angles to the plane of the drawing, is substantially totally reflected.

The transmitted sub-beam, which is designated by the reference numeral 3, is reflected at a retrodirective element 13 which comprises a positive lens 17 and a concave mirror 16 located in the focal plane of the lens. The beam 4 reflected at the retrodirective element 13, which beam is exactly parallel to, but shifted with respect to, the outgoing beam 3, again falls on the beam-splitting prism 11 and is transmitted, because its direction of polarisation is the same as that of the outgoing beam 3. The transmitted beam is designated by the reference numeral 5.

The sub-beam the plane of polarisation of which is at right angles to the plane of the drawing, and which after reflection at the mirror 23 is reflected at the interface 18 of the beam-splitting prism 11, is designated by the reference numeral 2. This sub-beam traverses a λ/4 plate 19 arranged with diagonal orientation, i.e. the principal axes of the λ/4 plate 19 are inclined at angles of 45° to the plane of polarization of the incident sub-beam 2. The sub-beam 2 then falls at normal or substantially normal incidence on the polished front face of a plane mirror 21, which is rigidly secured to a measuring slide 20. The sub-beam reflected at the mirror 21 traverses the λ/4 plate 19 a second time. The plane of polarisation of this sub-beam, which after its second passage through the plate 19 is designated by the reference numeral 6, has been rotated 90° with respect to that of the sub-beam 2, because the sub-beam 2 has effectively traversed a λ/2 plate. The sub-beam 6, the plane of polarisation of which consequently is parallel to the plane of the drawing, falls on the beam-splitting prism 11 and is transmitted by the interface 18. The transmitted sub-beam, which has been designated by the reference numeral 7, is reflected at a retrodirective element 12 comprising a positive lens 15 and a convex mirror 14 located in the focal plane of the lens. The beam reflected at the retrodirective element 12, which now has been designated by the reference numeral 8 and is exactly parallel to but shifted with respect to the outgoing beam 7, again falls on the beam-splitting prism 11 and is transmitted, because its plane of polarisation is the same as that of the outgoing beam. The transmitted beam has ben designated by the reference numeral 9. The sub-beam 9 traverses the λ/4 plate 19, is reflected at the front face of the plane mirror 21 and then traverses the λ/4 plate 19 a second time. The plane of polarisation of this sub-beam, which after its second passage through the λ/4 plate 19 has been designated by the reference numeral 10, has been rotated 90° with respect to that of the outgoing sub-beam 9. Consequently, the plane of polarisation of the sub-beam 10 is at right angles to the plane of the drawing. The sub-beam 10 falls on the beam-splitting prism 11 and is reflected at the interface 18. The reflected sub-beam 36 coincides in direction with the transmitted sub-beam 5, and the intensities of these beams are substantially equal, because the intensities of each of the sub-beams of which the beam is composed have been made equal.

The sub-beams 5 and 36 which emerge from the beam-splitting prism and are polarized at right angles to one another, fall on a λ/4 plate 24 arranged with diagonal orientation: the principal axes of the plate are inclined at angles of 45° to the plane of polarisation of each of the incident sub-beams. The two sub-beams 5 and 36 are converted in two oppositely circularly polarized beams. The sum of two circularly polarized beams of the same intensity and the frequency $\omega(=2\pi/\lambda)$ is a plane-polarized beam.

In order to facilitate a measurement of the location of the measuring slide 20, i.e. a measurement in the stationary condition of the slide also, a time-linear rotation is added to the orientation of the plane of polarisation of the plane-polarized beam 37. This addition is effected by means of an electro-optical modulator 25, which may comprise the series arrangement of three electro-optical crystals. An alternating voltage $V_1 = V \sin \Omega t$ is applied to the middle one of the three crystals and an alternating voltage $V_2 = V' \cos \Omega t$ is applied to the other two crystals, the arrangement being such as described in co-pending Dutch patent application 6715244 of prior date. The plane-polarized beam of light which emerges from the electro-optical modulator falls on a detector comprising a linear analyser 26 and a photo-electric cell 27. The electric signal produced in the photo-electric cell is processed in an electric processing circuit 28.

It can be shown that the signal produced in the photo-electric cell 27 has the following form:

$$I_1 = \text{const} + \sin\left(8\pi \frac{x}{\lambda} + 2\Omega t\right)$$

where $x$ is the displacement of the measuring slide 20 in a direction at right angles to that of the front surface of the mirror 21.

A system similar to the aforedescribed system may be provided to co-operate with a plane mirror 22 which is rigidly secured to the measuring slide 20 and the polished front surface of which is inclined to, for example is at right angles to, that of the mirror 21.

This provides a signal:

$$I_2 = \text{const} + \sin\left(8\pi \frac{y}{\lambda} + 2\Omega t\right)$$

Thus the displacement of the measuring slide 20 in two different directions can be measured in steps of ⅛λ.

So far it has been assumed that the radiation strikes the mirror 21 at normal incidence. It will be clear from the foregoing that on displacement of the mirror 21 in the direction of the incident light beam, i.e. in the x-direction normal to the mirror, there is produced an optical path difference equal to four times this displacement.

However, in practice the displacement of the mirror may be not a pure translation, but in addition to the translation a small rotation will occur which may be due, for example, to imperfections in the mechanical straight-line guidance of the slide. Therefore the question should be raised how far the path difference measured still represents the change in the normal distance of a fixed reference point O from the mirror, i.e. the X-co-ordinate of the displacement of the slide relative to the fixed point O; for since the slide together with the mirror 21 has been tilted, the x-direction normal to the mirror no longer coincides with the direction of the light beam. It is to be expected that the relationship between the X-co-ordinate of the displacement and the optical path difference is influenced by the tilting δ of the mirror 21 from the normal position. In order to calculate this influence the slide (together with the mirror) is assumed to be rotated about the fixed reference point O through an angle δ which obviously will be small.

From considerations of symmetry it follows that the series expansion of the path length change according to powers of δ contains only even powers of δ. In many cases, even the first term of this series, which term is proportional to δ², will be negligibly small, so that no further steps have to be taken. However, if very exacting requirements are to be satisfied, it is essential for this term to be kept as small as possible.

With reference to FIGS. 2 and 3, this term of the series expansion will now be calculated, and it will be investigated how this term (the so-called tilting error of the second order) can be made to disappear. Thus, there will remain only the tilting errors of the fourth and higher orders, which are much smaller than the second-order ones.

We start (FIG. 2) from the general case that a plane wave front is incident on the interface 18 of the beam-splitting prism 11. Of this plane wave only a ray PQ is shown which after reflection at the interface 18 and at the mirror 21 passes through the principal point H of the retrodirective element 12. The principal point H is that point on the axis of the retrodirective element an inverted image of which is formed on itself by this element. Since the point P' is the mirror image of the point P with respect to the plane 18 and H' is the mirror image of the principal point H with respect to the mirror 21, the path length of the wave from P to the retrodirective element 12 and back again to P will be equal to:

2P'H' + C where C is the optical path of the wave in the retrodirective element from H back to H.

If the wave falls on the mirror 21 at normal incidence (FIG. 3), P' will lie on the line joining the principal points H and H'. If the mirror 21 is tilted through an angle $\delta$ about a line passing through the fixed reference point O at right angles to the plane of the drawing, the principal point H' will become located at H'': H'' is the mirror image of H with respect to the mirror 21 in the new position thereof.

The path length of the wave form P' and back again to P' now is:

$$2P'V + C$$

where V is the projection of H'' on HP'.

A calculation shows that $$VH' = 2p - 2\left[p - \left(\frac{d}{\cos \delta} - d\right)\right]\cos^2 \delta$$

For small values of $\delta$ this becomes:

$$VH' = -\delta^2(p + \tfrac{1}{2}d)$$

Hence, if the change in the path length is to be negligibly small when the mirror 21 is tilted, the following requirement is to be satisfied:

$$p = -\tfrac{1}{2}d$$

In other words: the principal point H must be located midway between the mirror 21 and the tilting point O. This is obtainable by a suitable choice of the radius of curvature of the mirror 14. Whether this mirror is to be concave, plane or convex depends on the various dimensions.

It will be clear that this condition can only be exactly fulfilled for one value $x_0$ of the X-coordinate. However, if the arrangement is such that $x_0$ is the centre of the range of variation of $x$, it is ensured that the second order tilting error, though not exactly zero at all points, has been reduced to a minimum.

Obviously a displacement in three different directions, in particular in three mutually perpendicular directions, is measurable in steps of $\tfrac{1}{8}\lambda$ by using three of the afore-described systems. In addition to the plane mirrors 21 and 22, a third plane mirror will then be used the polished front surface of which is inclined to, in particular is perpendicular to, the front surfaces of the mirrors 21 and 22.

What is claimed is:

1. An apparatus for measuring the relative displacement of an object, in particular a measuring slide, with respect to a fixed reference point by means of at least one optical element which is rigidly secured mechanically to the object and reflects radiation from a source of radiation which emits two beams of radiation polarized at right angles to one another, which beams are divided in two spatially separated sub-beams by a polarisation-sensitive beam-splitting mirror, the optical element having been inserted in the path of one sub-beam so as to extend at right angles to the direction of this sub-beam, a reflector having been inserted in the path of the other sub-beam, which sub-beams are combined and then are applied to a radiation detector from which an electrical signal is derived which is a measure of the displacement, characterized in that there is inserted in the path of the sub-beam which is reflected at the optical element, which element is a high-precision plane, mirror, an $n\lambda/4$ plate (where $n$ is an odd integer) which is arranged in diagonal orientation and is traversed four times by the respective sub-beam, for which purpose this sub-beam after twice having traversed the $n\lambda/4$ plate is reflected, by way of the polarisation-sensitive beam-splitting mirror, at a retro-directive element.

2. An apparatus as claimed in claim 1, characterized in that the principal point of the retrodirective element lies on the line passing through the fixed reference point perpendicular to the optical element about midway between the fixed reference point and the optical element.

3. A system including at least two apparatuses as claimed in claim 1, wherein the optical element in each apparatus is inclined at an angle to the optical element in the other apparatus.

4. A system as claimed in claim 3, characterized in that the angle is 90°.

References Cited
UNITED STATES PATENTS 3,533,702    10/1970    Hock et al. _____ 356—167

WILLIAM L. SIKES, Primary Examiner